United States Patent
Gur et al.

(10) Patent No.: US 11,740,729 B2
(45) Date of Patent: Aug. 29, 2023

(54) ASSIGNING DEVICE IDENTIFIERS BY HOST IDENTIFIER AVAILABILITY

(71) Applicant: Microsoft Technology Licensing, LLC, Redmond, WA (US)

(72) Inventors: Arie Yehuda Gur, Kiryat Ono (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/213,009

(22) Filed: Mar. 25, 2021

(65) Prior Publication Data

US 2022/0308726 A1  Sep. 29, 2022

(51) Int. Cl.
  *G06F 3/041*  (2006.01)
  *G06F 3/044*  (2006.01)
  *G06F 3/0354*  (2013.01)

(52) U.S. Cl.
  CPC ...... *G06F 3/04162* (2019.05); *G06F 3/03545* (2013.01); *G06F 3/0442* (2019.05)

(58) Field of Classification Search
  CPC ............................ G06F 3/04162; G06F 3/0442
  See application file for complete search history.

(56) References Cited

U.S. PATENT DOCUMENTS

| | | |
|---|---|---|
| 9,898,100 B2 | 2/2018 | Ribeiro |
| 10,146,931 B1 * | 12/2018 | Kronrod ............. H04L 63/0846 |
| 10,496,872 B2 | 12/2019 | Holden et al. |
| 10,719,148 B2 | 7/2020 | Gilbert et al. |
| 2005/0283482 A1 * | 12/2005 | Lai ........................ G06F 3/0486 |
| 2006/0039316 A1 | 2/2006 | Ogushi |

(Continued)

FOREIGN PATENT DOCUMENTS

| | | |
|---|---|---|
| EP | 2637098 A1 | 9/2013 |
| EP | 3295283 A1 | 3/2018 |

OTHER PUBLICATIONS

Hung, et al., "WatchPen: Using Cross-Device Interaction Concepts to Augment Pen-Based Interaction", In Proceedings of the 21st International Conference on Human-Computer Interaction with Mobile Devices and Services, Oct. 1, 2019, 9 Pages.

(Continued)

*Primary Examiner* — Chun-Nan Lin
(74) *Attorney, Agent, or Firm* — Alleman Hall Creasman & Tuttle LLP

(57) ABSTRACT

A method for electronic device identifier assignment at a host computing device includes receiving a current local identifier of a separate electronic device and a full unique identifier of the separate electronic device. A host-specific identifier is assigned to the separate electronic device by, based at least in part on determining that the current local identifier of the separate electronic device is included in a set of local identifier values available for assignment, assigning the host-specific identifier to the separate electronic device with a same local identifier value as the current local identifier. Based at least in part on determining that the current local identifier of the separate electronic device is already assigned by the host computing device to a different separate electronic device, the host-specific local identifier is selected from the set of local identifier values available for assignment and assigned to the separate electronic device.

13 Claims, 6 Drawing Sheets

(56) References Cited

U.S. PATENT DOCUMENTS

| | | | |
|---|---|---|---|
| 2013/0181953 A1* | 7/2013 | Hinckley | G06F 3/03545 |
| | | | 345/179 |
| 2016/0261498 A1 | 9/2016 | Eastlake, III et al. | |
| 2016/0299583 A1 | 10/2016 | Watanabe | |
| 2016/0306447 A1* | 10/2016 | Fleck | G06F 3/044 |
| 2020/0019255 A1* | 1/2020 | Gilbert | G06F 3/03545 |
| 2020/0081560 A1* | 3/2020 | Geller | G06F 1/3259 |
| 2021/0089141 A1* | 3/2021 | Hisano | G06F 3/0446 |
| 2021/0208696 A1* | 7/2021 | Suzuki | G06F 3/03545 |
| 2021/0223875 A1* | 7/2021 | Nomura | G06F 3/0383 |
| 2021/0342111 A1* | 11/2021 | Kato | G06F 3/03545 |

OTHER PUBLICATIONS

"International Search Report and Written Opinion issued in PCT Application No. PCT/US22/018813", dated Jun. 22, 2022, 16 Pages.

* cited by examiner

ASSIGNING DEVICE IDENTIFIERS BY HOST IDENTIFIER AVAILABILITY

BACKGROUND

Computing devices may be configured to electronically "pair" with one or more other electronic devices—e.g., electronic accessories such as styluses, mice, and keyboards. By pairing with an electronic device, a computing device may establish a unidirectional or bidirectional communications channel over which one device may send data to another. For example, operation of the computing device may be controlled by a paired accessory, or an accessory may play media originating from the computing device. Pairing may be facilitated through the exchange of identifiers between the computing device and electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for electronic device identifier assignment at a host computing device includes receiving, from a separate electronic device, a current local identifier of the separate electronic device and a full unique identifier of the separate electronic device. A host-specific identifier is assigned to the separate electronic device by, based at least in part on determining that the current local identifier of the separate electronic device is included in a set of local identifier values available for assignment, assigning the host-specific identifier to the separate electronic device with a same local identifier value as the current local identifier. Based at least in part on determining that the current local identifier of the separate electronic device is already assigned by the host computing device to a different separate electronic device, the host-specific local identifier is selected from the set of local identifier values available for assignment and assigned to the separate electronic device.

DETAILED DESCRIPTION

Figure 1A:
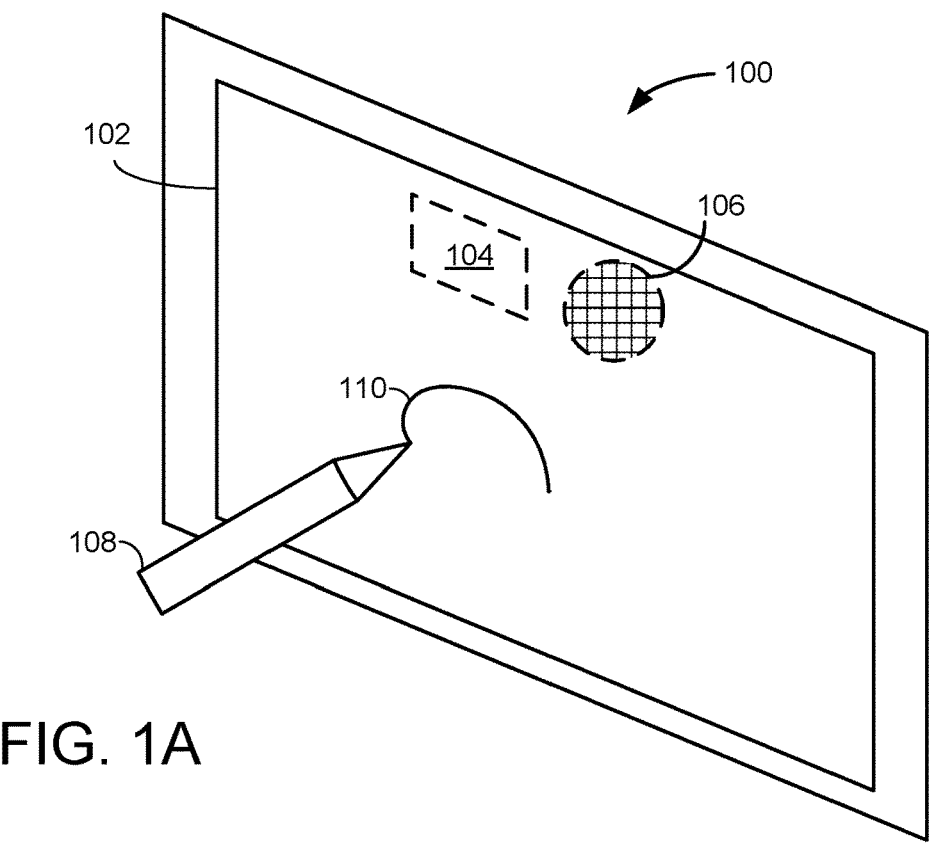
FIGS. 1A and 1B schematically show two different example host computing devices and an example electronic device.

As discussed above, electronic pairing of a computing device with a separate electronic device may be used to establish a unidirectional or bidirectional channel over which one device may send data to another. For example, a computing device that includes a touch-sensitive display may pair with an electronic device taking the form of an active stylus. In this manner, the stylus may control operation of the computing device—for example, the stylus may include a physical button that, when actuated, causes the computing device to launch a corresponding application. Similarly, the stylus may provide touch or hover inputs to the touch-sensitive display—e.g., to interact with software interfaces, to draw lines or shapes—while the computing device controls haptic feedback functionality of the stylus.

In a common scenario, a user may use the same electronic device (e.g., stylus) with multiple different host computing devices (e.g., touch-sensitive display devices) at different times. For example, the user may use a stylus with their own computer, a coworker's computer, a shared office computer, etc. In various cases, the user may prefer to use substantially similar settings—e.g., relating to haptic feedback behavior, or a preferred color to be used with touch "ink" inputs—regardless of the host computing device that the user is interacting with. In other cases, the user may prefer to use different settings profiles depending on the current host computing device they are using. In any case, however, it is generally desirable to establish the pairing relationship as quickly as possible—e.g., to reduce the amount of time in which the user's preferred settings are not applied, or to reduce the amount of time in which the user's control inputs cause an unintended device to respond.

In some cases, pairing a computing device with a separate electronic device may require manual effort on the part of the user—e.g., the user may be required to manually interact with physical or software-based connection settings of the computing device and/or electronic device to establish a pairing. Even in cases where automatic pairing is possible, there will inherently be some amount of latency associated with pairing a computing device with a separate electronic device, and such latency can be distracting or disruptive. In one example scenario, a user may use an electronic device (e.g., an active stylus) to control a first computing device (e.g., a first tablet), then move the electronic device to a second computing device (e.g., a second tablet belonging to a different user), intending to use their stylus to control the second device. In this stylus/tablet example, even though the second tablet may automatically pair with the stylus, there may still be a noticeable latency period during which the stylus and second tablet are not paired, and thus the stylus for a time may not provide the correct haptic feedback, cause use of a desired inking color, etc. Furthermore, during this latency interval, the stylus may still be paired with the first tablet, and thus any control inputs originating from the stylus may cause the first tablet to respond. For example, the user may press a button on the stylus intending to launch an application on the second tablet, only for the first tablet to respond.

Accordingly, the present disclosure is directed to techniques for assigning identifiers to electronic devices in a manner that can result in faster and more consistent device pairings. Specifically, upon successfully pairing with an electronic device, a computing device may assign to the electronic device a local identifier, taking the form of a relatively small value that can be used by the computing device to quickly identify the electronic device in the future. For example, during a future pairing between the electronic device and computing device, the electronic device may transmit its current local identifier, which the computing device may use to quickly apply a settings profile associated with the electronic device.

Notably, however, this can create a situation in which the same electronic device is known to multiple different computing devices by multiple different local identifiers. Thus, when pairing with a computing device that the electronic device has previously paired with, the electronic device may provide a local identifier that differs from the one previously assigned to the electronic device by the computing device—e.g., because the local identifier has paired with a different computing device and been assigned a different local identifier in the intervening time. This can create a noticeable latency interval in which the computing device applies the incorrect settings, until the full unique identifier of the electronic device is eventually received, and the correct settings are applied. Furthermore, a second electronic device may attempt to pair with the computing device while coincidentally using the same local identifier that the computing device had previously assigned to the first electronic device. This can cause the computing device to briefly load settings for the first electronic device, even though it is communicating with the second electronic device.

Accordingly, the device identifier assignment techniques described herein may beneficially result in the same electronic device being known by the same local identifier to any or all of the various different computing devices that the electronic device is used with. Specifically, upon pairing with an electronic device, a host computing device may assign a host-specific local identifier to the electronic device in a manner that attempts to preserve the existing local identifier of the electronic device, if possible. If the current local identifier of the electronic device is unavailable for assignment by the computing device, the host-specific local identifier assigned to the electronic device will have a new value. Alternatively, if the current local identifier of the electronic device is not reserved by the host computing device for use by a different electronic device, then the host-specific local identifier assigned to the electronic device will be the same as the electronic device's current local identifier. In this manner, as the electronic device pairs with different computing devices over time, the different computing devices will gradually converge toward a consensus, in which the electronic device is known to each of the different computing devices by the same local identifier. This can make the device pairing process faster and more efficient as described above, as any computing device can quickly apply a correct settings profile for the electronic device upon receiving the electronic device's local identifier.

FIG. 1A schematically shows an example first host computing device 100, including a touch-sensitive display 102. Both the touch-sensitive display 102 and computing device 100 may have any suitable size and dimensions. In some examples, a computing device may include more than one touch-sensitive display. For example, a computing device as described herein may refer to a device having two or more touch-sensitive displays in a foldable or static configuration, as well as single-display devices such as display device 100. Alternatively, computing devices need not include touch-sensitive displays, but rather may have any suitable form factor and include any suitable combination of computer hardware. As non-limiting examples, computing devices can include desktop computers, laptops, smartphones, tablets, mixed reality devices, fitness devices (e.g., smartwatches), media center devices, automotive computing devices, etc. Furthermore, it will be understood that the techniques described herein may be applied in any scenario in which two different devices attempt to establish a pairing relationship, in which one device will apply certain settings or perform certain behaviors particular to the identity of the other device. In some cases, a "computing device" as described herein may be implemented as computing system 600 described below with respect to FIG. 6.

Figure 1B:
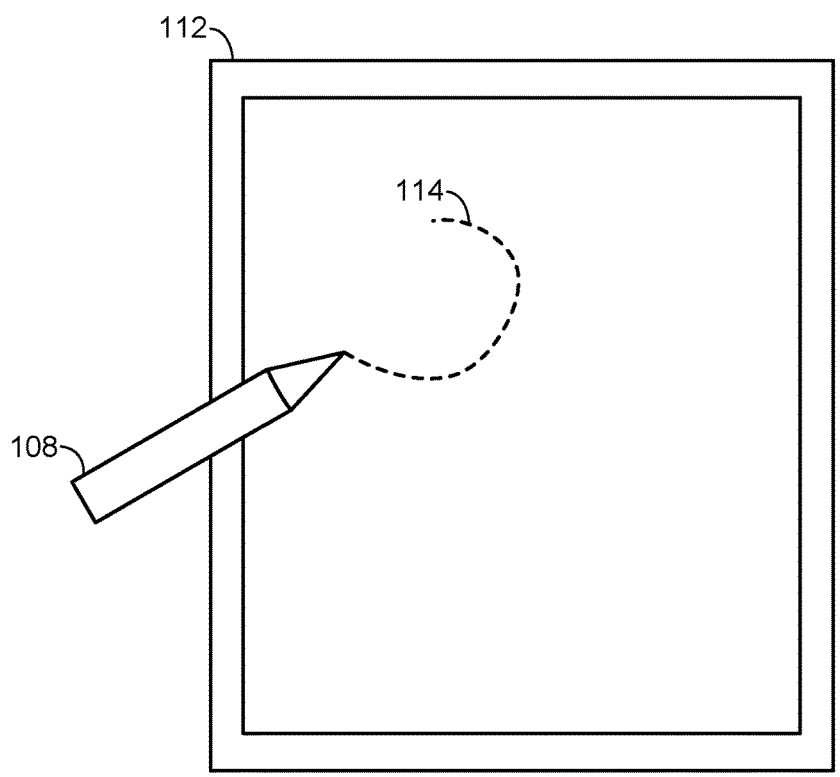

It will be understood that the devices and components depicted in FIGS. 1A and 1B, as well as the other FIGS. described herein, are simplified and schematic in nature. In practical examples, computing devices and separate electronic devices may include additional or alternative components to those described herein, may have any suitable shapes, sizes, and form factors, and may have any suitable capabilities.

Host computing device 100 includes a controller 104 configured to perform one or more of the computing functions described herein. For example, as will be described in more detail below, controller 104 may be configured to receive local identifiers from a separate electronic device, and transmit host-specific identifiers to the separate electronic device. In some examples, the controller may include one or more computer processors, or other suitable logic hardware, working in tandem with one or more volatile or non-volatile data storage devices, or other suitable storage hardware. In some examples, controller 104 may be implemented via logic subsystem 602 and storage subsystem 604 described below with respect to FIG. 6.

Touch-sensitive display 102 includes a plurality of display electrodes, including electrodes 106, which may be configured to detect proximity of input objects to the touch-sensitive display. Input objects may include, as examples, human fingers, passive styluses, active styluses, and other suitable electronic devices or non-electronic objects. For example, the display electrodes may detect a change in capacitance caused by proximity of an input object to the display surface. By monitoring electrical conditions at the plurality of display electrodes, controller 104 may determine the two-dimensional position of the touch input relative to the surface of the display. Display electrodes 106 and controller 104 are shown with dashed lines to indicate that they are disposed beneath the display surface and would not ordinarily be visible from the illustrated perspective.

In FIG. 1A, a separate electronic device 108 is contacting the surface of touch-sensitive display 102. In this example, the electronic device takes the form of an active stylus. Based at least in part on the contact between the stylus and the display, the computing device is rendering visual content 110, taking the form of a line that reflects movement of the electronic device relative to the surface of the display over a particular window of time. It will be understood, however, that electronic device 108 is a non-limiting example, and that an "electronic device" as described herein need not take the form of a stylus. Rather, electronic devices may include, as non-limiting examples: styluses, computer mice, keyboards, media playback devices (e.g., speakers, headphones), media capture devices (e.g., cameras, microphones), control devices (e.g., remote controls, video game controllers, control dials), sensors, and IoT (Internet of Things) devices.

FIG. 1B again shows electronic device 108, this time contacting a different host computing device 112, which also includes a touch-sensitive display. As with host computing device 100, however, it will be understood that host computing device 112 is a non-limiting example, and that the techniques described herein may be applied with any suitable computing devices having any hardware configurations and form factors. In FIG. 1B, contact between electronic device 108 and host computing device 112 causes the host computing device to render graphical content 114, again taking the form of a line that reflects touch input of the electronic device relative to the surface of the display. In FIG. 1B, however, the graphical content is depicted using a dashed line, indicating that it is a different color from graphical content 110 shown in FIG. 1A.

For example, the electronic device may have been recently moved from host computing device 100 to host computing device 112, and thus device 112 has not yet applied a correct settings profile for electronic device 108, meaning the user's "ink" input is not represented using their intended color. As additional examples, the incomplete pairing between electronic device 108 and host computing device 112 may cause the electronic device to use incorrect haptic feedback settings (or provide no haptic feedback at all), or any control inputs transmitted by the electronic device may cause an unintended computing device (e.g., device 100) to respond.

Figure 2:
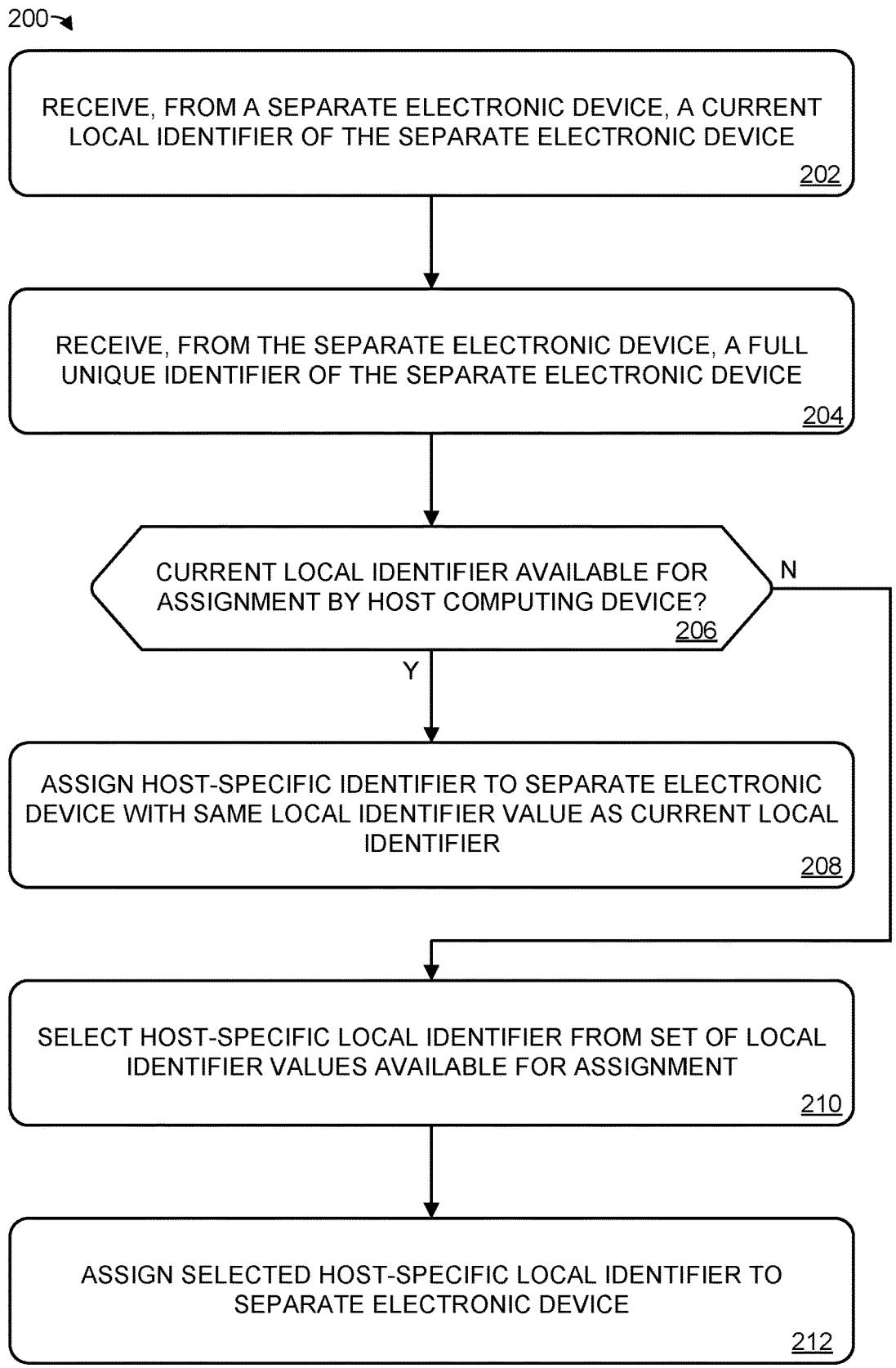
FIG. 2 illustrates an example method for electronic device identifier assignment.

Accordingly, FIG. 2 illustrates an example method 200 for electronic device identifier assignment that may reduce the latency interval associated with pairing an electronic device with a computing device, as discussed above. Method 200 may be implemented by any suitable computing system of one or more computing devices, particularly when pairing with a separate electronic device. Devices implementing method 200 may have any suitable capabilities, hardware configurations, and form factors. As non-limiting examples, method 200 may be implemented by either or both of computing devices 100 and 112 of FIG. 1, and/or computing system 600 described below with respect to FIG. 6.

At 202, method 200 includes receiving, from a separate electronic device, a current local identifier of the separate electronic device. The current local identifier may take any suitable form. In general, the current local identifier will take the form of one or more values that can be transmitted relatively quickly to a computing device during pairing, such that the computing device can relatively quickly apply any previously-saved settings associated with the current local identifier. In one example, the current local identifier may take the form of a 3-bit value, meaning there may be eight possible identifier values of the local identifier of an electronic device. A 3-bit value may beneficially enable relatively fast transmission of the current local identifier to the computing device, while providing enough uniqueness that the host computing device does not rapidly deplete its set of available identifier values. Furthermore, using relatively longer identifier values can increase the length of time associated with different host computing device reaching a consensus and each using the same local identifiers to refer to the same electronic devices. In other examples, however, the local identifier may have any suitable length. In some cases, the length of the local identifier of the electronic device may be tuned based on the communications bandwidth between the computing device and electronic device, and the number of different electronic devices that the computing device is configured to support.

This is schematically illustrated with respect to FIG. 3, again showing computing device 100 and electronic device 108. As shown, computing device 100 receives a current local identifier 300 from electronic device 108, after the identifier is transmitted by a controller 302 of the electronic device. As with controller 104, controller 302 may take the form of any suitable computer logic componentry, working in tandem with any suitable data storage componentry. As one example, controller 302 may be implemented via logic subsystem 602 and storage subsystem 604 described below with respect to FIG. 6.

In some cases, upon receiving the current local identifier of the electronic device, the host computing device may attempt to pair with the electronic device. As will be described in more detail below, the host computing device may maintain a list of local identifiers that have been reserved for use by various different electronic devices that have previously paired with the host computing device. Thus, upon receiving a current local identifier that matches one of the reserved local identifiers, the host computing device may attempt to pair with the electronic device, and load settings associated with the reserved identifier value.

In an ideal scenario, this may significantly reduce the amount of latency associated with pairing an electronic device with a host computing device. Specifically, the settings associated with a particular electronic device may be loaded upon receiving a local identifier that has been reserved for use by the electronic device, and the local identifier can be transmitted relatively quickly. This does, however, create the risk that incorrect settings will be loaded—e.g., in the case that the electronic device has not previously paired with the computing device, but is instead coincidentally using the same identifier value that the host computing device has previously reserved for use by a different electronic device. In this case, while incorrect settings may initially be loaded, the host computing device may load the correct settings a short time later, when the full unique identifier for the electronic device is received. Furthermore, as will be described in more detail below, the identifier assignment techniques described herein may cause different independent host computing devices to gradually converge toward using the same local identifiers for the same electronic device, thereby reducing the risk of future conflicts.

The current local identifier of the electronic device may be received at the computing device in any suitable way. In some cases, the current local identifier may be received electrostatically. As discussed above, the computing device may in some cases include a touch-sensitive display that in turn includes a plurality of display electrodes. Similarly, the electronic device may take the form of an active stylus including one or more stylus electrodes. The stylus electrodes may be driven with different signals, thereby producing an electrostatic effect that is detectable at the display electrodes of the host computing device. In some cases, the signals supplied to the stylus electrodes may be modulated in such a manner as to encode the current local identifier of the stylus. Thus, when the electrostatic signals are detected at the host computing device, the current local identifier may be decoded and interpreted.

In other examples, however, the current local identifier may be received in other suitable ways, particularly in examples where the computing device does not include a touch-sensitive display. For example, the first identifier may be received via a suitable wireless communications interface of the computing device—e.g., a Bluetooth interface or other suitable radio frequency (RF) communications interface.

Returning to FIG. 2, at 204, method 200 includes receiving, from the separate electronic device, a full unique identifier of the separate electronic device. This is also schematically illustrated with respect to FIG. 3, in which host computing device 100 receives a full unique identifier 304 transmitted by controller 302. In contrast to the current local identifier, the full unique identifier will take the form of one or more values that have sufficient length and complexity as to uniquely identify the electronic device. In other words, the length of the full unique identifier may be set such that no two electronic devices have the same full unique identifier. As with the local identifier, the full unique identifier of the electronic device may be received at the host computing device via any suitable communications channel—e.g., electrostatically, or over via a suitable RF protocol such as Bluetooth.

Returning briefly to FIG. 2, at 206, method 200 includes determining whether the current local identifier received from the electronic device is available for assignment by the host computing device. From there, the host computing device assigns a host-specific identifier to the electronic device, and the nature of the host-specific identifier will depend on whether the current local identifier of the electronic device is available for assignment, as will be described in more detail below.

Figure 3:
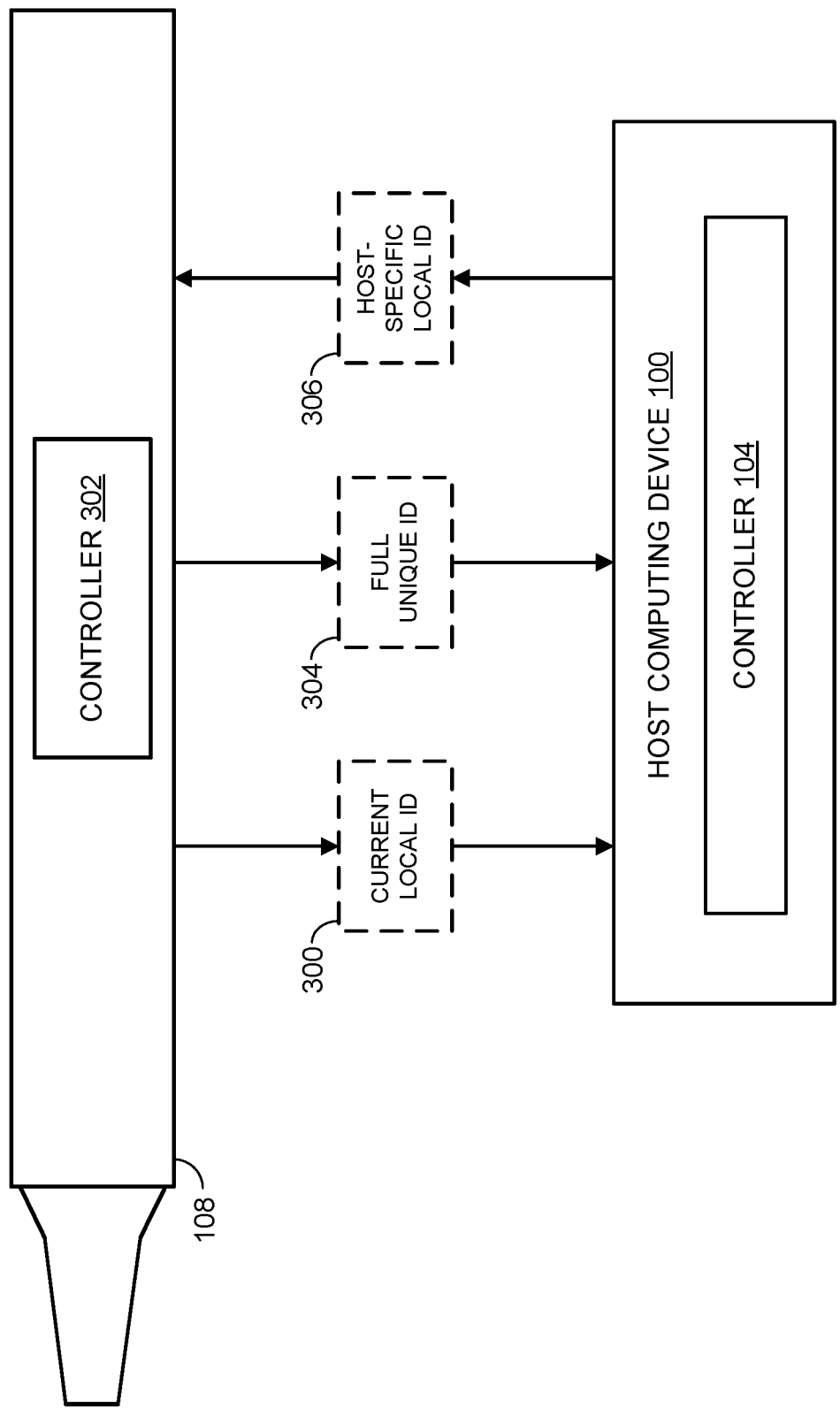
FIG. 3 schematically illustrates exchange of data between a host computing device and a separate electronic device.

In FIG. 3, a host-specific identifier 306 is transmitted from computing device 100 to electronic device 108. The host-specific local identifier will typically take the same form as the previously-received local identifier of the electronic device—e.g., when the current local identifier of the electronic device is a 3-bit value, then the host-specific local identifier may be a same or different 3-bit value. In other words, the host-specific identifier takes the form of one or more values that can be used by the host computing device to identify the electronic device during future pairings.

Notably, the host computing device may assign a different host-specific local identifier to each different electronic device that it pairs with. In this manner, the host computing device may more quickly and easily pair with such electronic devices, upon receiving the same host-specific local identifier from an electronic device as was previously assigned to the electronic device by the host computing device. Given this, the host computing device may maintain a set of local identifier values that are reserved for use by electronic devices that the host computing device has previously paired with. The host computing device may also maintain a set of local identifier values that are available for assignment—i.e., upon pairing with a new electronic device for the first time, the host computing device may assign to the electronic device a host-specific local identifier selected from the set of available identifiers maintained by the host computing device.

This is schematically illustrated with respect to FIG. 4, again showing host computing device 100 exchanging data with electronic device 108. As shown, host computing device 100 maintains a set of reserved local identifier values 400. This includes host-specific local identifier values "000," "100," "110," and "111," which have been reserved for various electronic devices that have previously paired with host computing device 100. Each host-specific local identifier value is associated with the full unique identifier of the electronic device that the host-specific local identifier was assigned to. Thus, if the computing device receives a current local identifier from a nearby electronic device that matches a local identifier in the reserved identifiers list, the host computing device may attempt to pair with the electronic device, and/or otherwise apply settings associated with the reserved identifier. Once the full unique identifier is received, the computing device can compare the full unique identifier received from the electronic device to the full unique identifier stored in the reserved identifiers list. In this manner, the computing device may confirm that the nearby electronic device is the same as the device to which the host-specific local identifier was previously assigned, and not a different electronic device that is using the same local identifier by coincidence. In the latter case, the host computing device may revert any settings that were applied incorrectly.

Regardless, based at least on receiving a current local identifier from an electronic device, the host computing device compares the current local identifier to the set of reserved local identifiers, and/or the set of available local identifiers, to determine whether the current local identifier of the electronic device is available for assignment. Returning briefly to FIG. 2, if the current local identifier is available for assignment, method 200 proceeds to 208. At 208, based at least on determining that the current local identifier of the separate electronic device is included in a set of local identifier values available for assignment by the host computing device, the host computing device assigns the host-specific identifier to the separate electronic device with a same local device identifier as the current local identifier.

With reference again to FIG. 4, host computing device 100 receives current local identifier 300 from electronic device 108. Based at least on determining that the current local identifier is included in the set of available local identifiers 402 (YES at 206), then the host-specific local identifier 306 transmitted to the electronic device will have the same value as the current local identifier. For example, if current local identifier 300 has a value of "011," then host computing device 100 may determine that the current local identifier is available for assignment, and the host-specific local identifier will also have a value of "011." In the case that the electronic device's current local identifier had been assigned during pairing with a different host computing device, then this approach will cause both host computing devices to use the same host-specific local identifier to refer to the same electronic device. This can facilitate faster and more efficient pairings between the electronic device and host computing devices in the future, as it reduces the risk that the electronic device will provide a current local identifier that happens to be reserved by a computing device for a different electronic accessory, causing the wrong settings profile to be applied, or causing the computing device to attempt to pair with the wrong electronic device.

Figure 4:
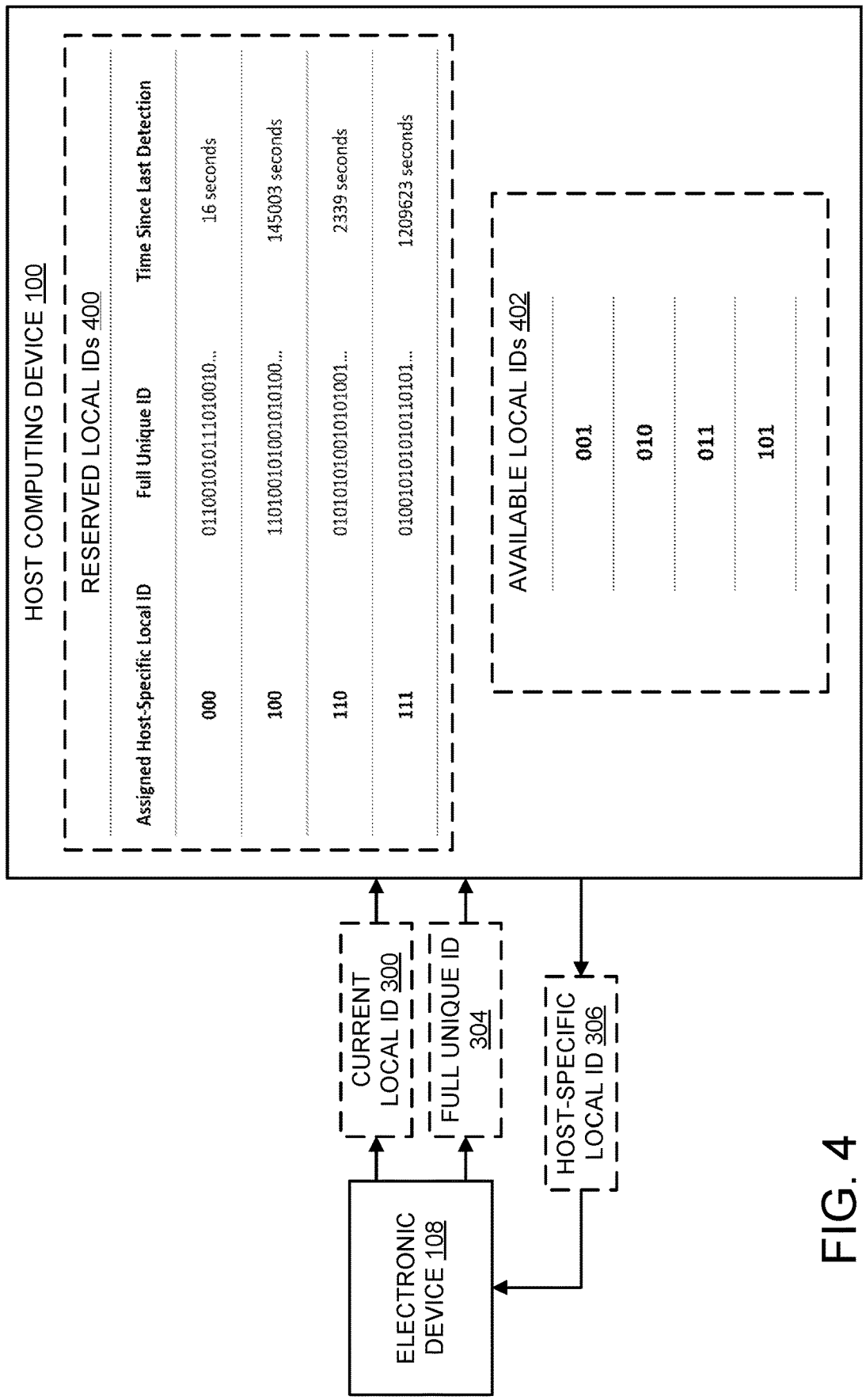
FIG. 4 schematically illustrates comparison of a current local identifier of an electronic device to available electronic identifiers of a host computing device.

It will be understood that the specific values shown in FIG. 4 are non-limiting examples and provided solely for the sake of illustration. In practical examples, local identifiers having any suitable length may be used, and any number of such identifiers may be reserved by a host computing device for various electronic devices that the host computing device has paired with.

Returning to FIG. 2, if the current local identifier of the electronic device is not available for assignment (NO at 206), method 200 proceeds to 210. At 210, based at least on determining that the current local identifier of the separate electronic device is already assigned by the host computing device to a different separate electronic device having a different full unique identifier, the host computing device assigns a new host-specific local identifier to the separate electronic device, the new host-specific local identifier having been selected from the set of local identifier values available for assignment by the host computing device.

With reference again to FIG. 4, in this example, host computing device 100 receives the current local identifier 300 from the electronic device and determines that the value of the current local identifier is included in the set of reserved local identifiers 400. For example, the current local identifier may have a value of "110," meaning that, in this example, the local identifier has already been assigned by the host computing device to a separate electronic device.

Upon receiving full unique identifier 304 from electronic device 108, the host computing device compares identifier 304 to the full unique identifier associated with local identifier "110" in set 400. If identifier 304 matches the stored full unique identifier, the host computing device determines that the electronic device has previously paired with the host computing device, and may in some cases refrain from sending host-specific local identifier back to the electronic device. Rather, in this case, the host computing device may attempt to pair with the electronic device (e.g., by applying a settings profile associated with the local identifier), either before or after the full unique identifier is received.

By contrast, if identifier 304 does not match the stored full unique identifier, the host computing device determines that the electronic device is an unrecognized device that is coincidentally using a local identifier value that the host computing device has already reserved for use by a different electronic device. In this case, the host computing device selects a new host-specific local identifier from the set of local identifier values 402 (e.g., identifier value "101"). Returning briefly to FIG. 2, at 212, method 200 includes assigning the selected host-specific local identifier to the separate electronic device. For example, host computing device 100 may assign the selected host-specific local identifier (e.g., identifier value "101") to electronic device 108.

As another possibility, based at least on receiving a full unique identifier of an electronic device, the host computing device may determine that the full unique identifier is associated with a local identifier in the set of reserved local identifiers, and thus determine that the electronic device has previously paired with the host computing device. However, the current local identifier transmitted by the electronic device may differ from the one stored in the set of reserved local identifiers. This may be the case when, for example, the current local identifier of the electronic device was changed by a different host computing device that the electronic device has more recently paired with. In this case, when assigning a new host-specific local identifier to the electronic device, the host computing device may refrain from assigning the same local identifier value that was previously reserved for use by the electronic device. Rather, the host computing device may use a different identifier value from the set of available identifier values. This may mitigate the risk that, after the current local identifier of the electronic device is updated, it will again be changed when it pairs with a different computing device, thereby slowing the process by which different host computing devices converge toward using the same local identifiers for the same electronic devices.

The host computing device may use any suitable criteria for selecting a new host-specific local identifier from the set of local identifier values available for assignment. In one example, the host computing device may select a first available local identifier value (e.g., value "001" in the example of FIG. 4). In other examples, however, selecting the selected host-specific local identifier may include randomly selecting a local identifier value of the set of local identifier values available for assignment. Random selection may be beneficial in some scenarios, as it reduces the risk that the identifier values assigned by different independent computing devices will be clustered toward one end of the range of possible identifier values, producing more conflicts. Rather, random selection of host-specific local identifier values can improve the likelihood that the selected host-specific local identifier value is not already in use by other computing devices, and this can improve the rate at which the different computing devices converge toward a consensus—i.e., by each using the same host-specific local identifier values to refer to the same electronic device.

In the example of FIG. 4, the set of reserved local identifiers 400 and the set of available local identifiers 402 are mutually exclusive. In other words, no common identifier values are shared between the set of reserved values and the set of available values. It will be understood, however, that this need not always be the case. Rather, in some examples, the set of available local identifiers may include one or more values that are also included in the reserved identifiers list. As will be described in more detail below, the host computing device may in some cases utilize one or more aging policies, by which reserved identifiers may be made available. Thus, the set of available identifier values may include, for example, identifier values that are reserved for use by a different electronic device, but are older than a threshold age. Thus, based at least on such an identifier value being assigned to a new electronic device, the full unique identifier associated with the reserved local identifier may be updated to reflect the new electronic device, and the identifier value may be removed from the set of available identifier values.

In the example of FIG. 4, four different identifier values are in the set of available local identifier values 402. In other examples, however, a situation may arise in which all possible local identifier values (e.g., all eight different values in the case of 3-bit identifiers) may already be in use, and thus the set of available local identifier values is empty. To this end, the host computing device may in some cases utilize one or more aging policies, in which host-specific local identifiers corresponding to electronic devices that have not recently paired with the host computing device are removed from the list of reserved local identifier values and made available for assignment to new electronic devices.

For example, the host computing device may be configured to track a length of time since a particular electronic device (e.g., electronic device 108) was last detected by the host computing device. Based at least on the length of time exceeding a threshold time, the host-specific local identifier corresponding to that electronic device may be returned to the set of local identifier values available for assignment. Thus, in FIG. 4, the list of reserved local identifier values 400 includes, for each reserved identifier, a time since an electronic device corresponding to that identifier was last detected. Based at least on that time exceeding a predetermined threshold (e.g., one day, one week, one month), the corresponding identifier value may be removed from the reserved identifiers list and made available for assignment to a different electronic device. This may beneficially reduce the risk that the set of available identifiers will be depleted during pairing with a new electronic device, which can slow (or prevent) the pairing process unless an identifier value is made available. Furthermore, by returning reserved identifier values for devices that have not recently paired, the risk that a commonly-used electronic device will lose its identifier, and thus take more time during subsequent pairing, may beneficially be reduced.

Even in cases where such aging is applied, the set of local identifier values available for assignment may nonetheless be depleted. Thus, the host computing device may additionally or alternatively be configured to, based at least on determining that all possible local identifier values have been assigned to a plurality of different separate electronic devices, identify a separate electronic device of the plurality of separate electronic devices that has been least-recently detected by the host computing device. From there, the host computing device may return a host-specific local identifier corresponding to the least-recently detected separate electronic device to the set of local identifier values available for assignment. Again, this may beneficially ensure that, when a new electronic device attempts to pair with the host computing device, a host-specific local identifier value will be available for assignment to the electronic device.

It will be understood, however, that the above policies are non-limiting approaches to ensuring that local identifiers are available for assignment to electronic devices. In other examples, other suitable policies may be used.

Figure 5:
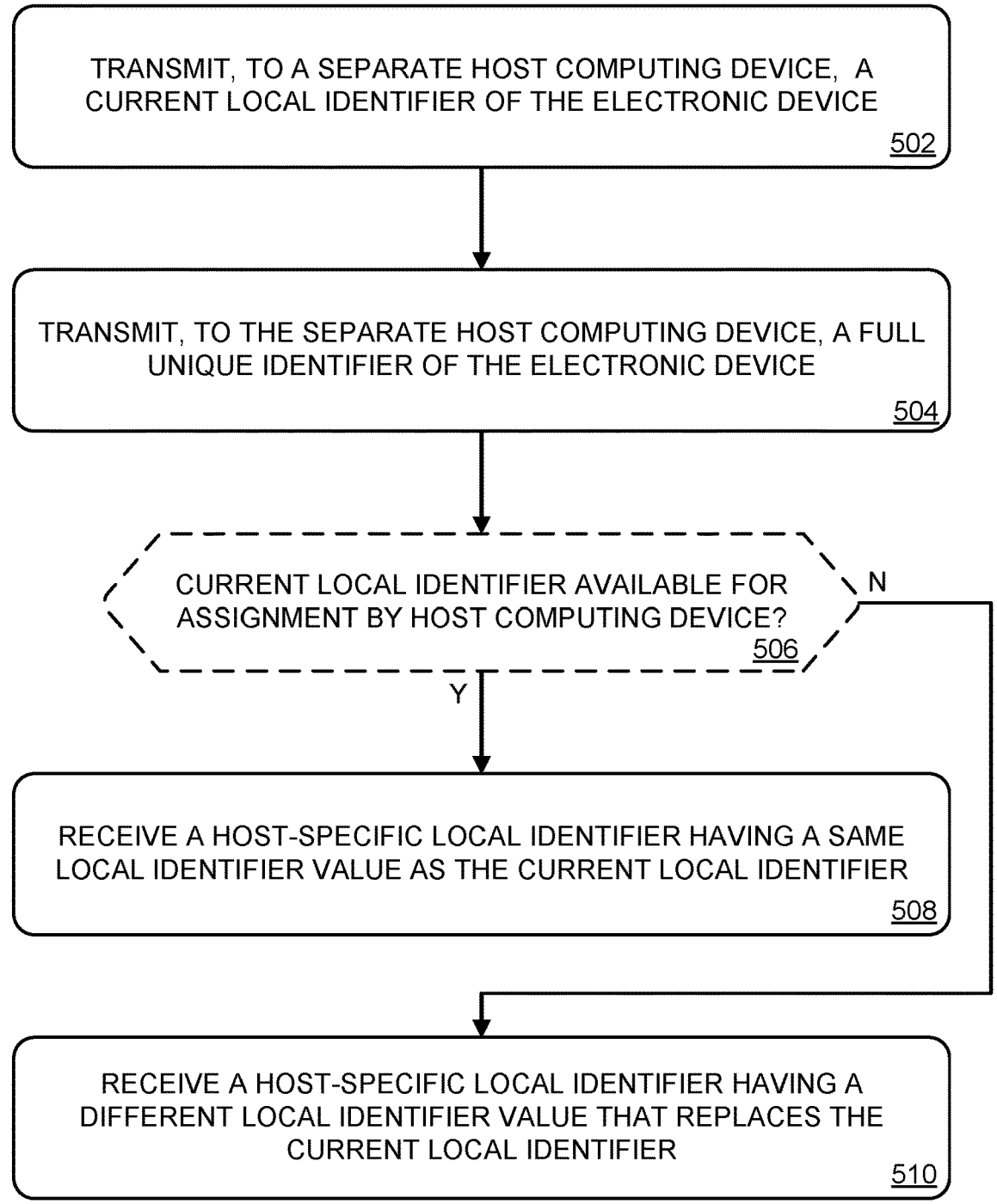
FIG. 5 illustrates an example method for electronic device identifier assignment.

The present disclosure has thus far primarily focused on operations performed by the host computing device during pairing. Turning now to FIG. 5, an example method 500 is illustrated that focuses on actions performed by an electronic device during pairing with a host computing device. As with method 200, method 500 may be implemented by any suitable device, having any suitable capabilities, hardware configuration, and form factor. As non-limiting examples, method 500 may be implemented by electronic device 108 or computing system 600 described below with respect to FIG. 6.

At 502, method 500 includes transmitting, to a separate host computing device, a current local identifier of the electronic device. This may be done substantially as described above with respect to FIGS. 2 and 3. Furthermore, the current local identifier may be transmitted at any suitable time and for any suitable reason. In one example, the current local identifier may be transmitted in response to detecting proximity of the electronic device to a host computing device. In other words, upon detecting presence of a nearby computing device (e.g., via a change in electrostatic properties at a stylus electrode, or detecting RF signals emitted by the computing device), the electronic device may transmit its current local identifier one or more times for detection at the computing device.

In other examples, however, the current local identifier may be transmitted regardless of proximity of the electronic device to the computing device. For example, the electronic device may be configured to repeatedly transmit the current local identifier even when no nearby computing devices are detected. In the event that a nearby computing device does receive the current local identifier, repeated transmission of the current local identifier may be discontinued. For example, the computing device may transmit an acknowledgement to the electronic device confirming receipt of the current local identifier, and the computing device may discontinue repeated transmission of the first identifier when the acknowledgement is received.

Furthermore, the particular current local identifier transmitted to the computing device may have any suitable origin. In many cases, the current local identifier will have previously been assigned to the electronic device by a computing device with which the electronic device has previously paired (e.g., the same or a different computing device with which the electronic device is currently communicating). In some scenarios, however, the current local identifier of the electronic device may have been assigned at manufacture of the electronic device. Alternatively, the electronic device may be manufactured with no local identifier, but rather may be assigned its first local identifier by the first host computing device that it pairs with. In other words, upon manufacture, the electronic device may be assigned a current local identifier (e.g., randomly, or by another assignment process). Alternatively, upon manufacture, the electronic device may have no local identifier until it is assigned a local identifier by a host computing device that it pairs with. In the event that an electronic device having no local identifier attempts to pair with a host computing device, the electronic device may refrain from sending any local identifier, or send an empty (NULL) value, as non-limiting examples.

Continuing with method 500, at 504, the electronic device transmits, to the separate computing device, a full unique identifier of the electronic device. Again, this may be done substantially as described above with respect to FIGS. 2 and 3. In some cases, the full unique identifier may be transmitted after the host computing device has received the current local identifier (e.g., the host computing device may transmit an acknowledgement confirming receipt of the current local identifier). However, as with the current local identifier, the electronic device may transmit the full unique identifier at any suitable time and for any suitable reason.

After the full unique identifier is transmitted, the electronic device receives a host-specific local identifier from the host computing device. As discussed above, the nature of the host-specific local identifier will vary based on whether the current local identifier of the electronic device is available for assignment by the host computing device. Thus, method 500 includes a step 506, at which the host computing device determines whether the current local identifier used by the electronic device is available for assignment.

If YES at 506, method 500 proceeds to 508, where the electronic device receives a host-specific local identifier having a same local identifier value as the current local identifier of the electronic device, based at least in part on the current local identifier being in the set of local identifier values available for assignment by the separate host computing device. Alternatively, If NO at 506, method 500 proceeds to 510, where the electronic device receives a host-specific local identifier having a different local identifier value that replaces the current local identifier of the electronic device, based at least in part on the current local identifier of the electronic device being absent from the set of local identifier values available for assignment by the separate host computing device. Each of these steps may occur substantially as described above with respect to FIG. 4.

As discussed above, the same electronic device may in some cases be used with multiple different host computing devices, each of which may assign the electronic device a local identifier. Thus, after receiving the host-specific local identifier from the separate host computing device, the current local identifier of the electronic device may be replaced with a second host-specific local identifier received from a second separate host computing device. For example, after using their stylus to interact with a first touch-sensitive display device, a user may switch to using the stylus with a second touch-sensitive display device, which may also transmit a host-specific local identifier to the stylus as described above.

In some cases, the second host-specific local identifier may be the same as the first host-specific local identifier. In this case, the current local identifier of the electronic device need not be changed, as two different computing devices now beneficially refer to the electronic device using the same local identifiers. In other cases, however, the second host-specific local identifier may differ from the first host-specific local identifier, in which case the current local identifier of the electronic device may again be updated. Over time, however, assignment of device identifiers as described herein may cause the various different computing devices that any particular electronic device pairs with to gradually converge toward a consensus, where each computing device uses the same local identifier to refer to the electronic device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 6:
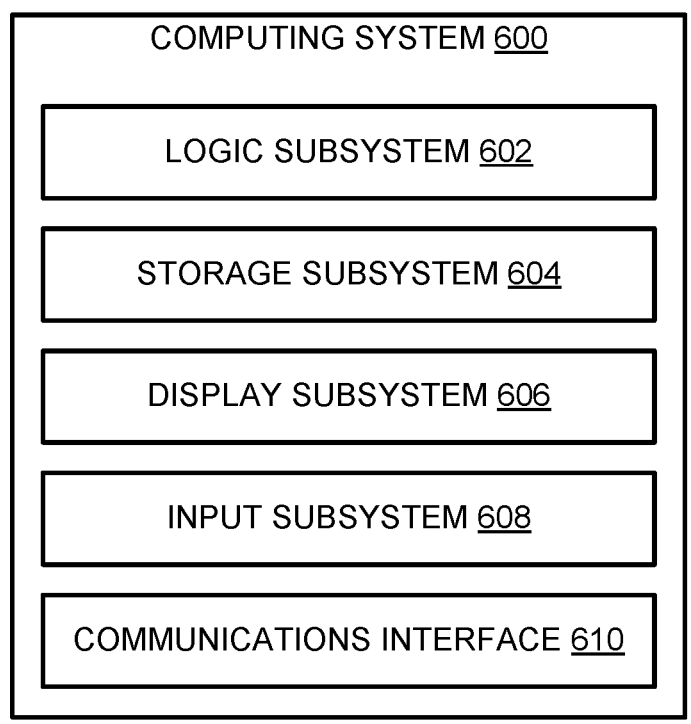
FIG. 6 schematically shows an example computing system.

FIG. 6 schematically shows a simplified representation of a computing system 600 configured to provide any to all of the compute functionality described herein. Computing system 600 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 600 includes a logic subsystem 602 and a storage subsystem 604. Computing system 600 may optionally include a display subsystem 606, input subsystem 608, communication subsystem 610, and/or other subsystems not shown in FIG. 6.

Logic subsystem 602 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 604 includes one or more physical devices configured to temporarily and/or permanently hold computer information such as data and instructions executable by the logic subsystem. When the storage subsystem includes two or more devices, the devices may be collocated and/or remotely located. Storage subsystem 604 may include volatile, nonvolatile, dynamic, static, read/write, read-only, random-access, sequential-access, location-addressable, file-addressable, and/or content-addressable devices. Storage subsystem 604 may include removable and/or built-in devices. When the logic subsystem executes instructions, the state of storage subsystem 604 may be transformed—e.g., to hold different data.

Aspects of logic subsystem 602 and storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 606 may be used to present a visual representation of data held by storage subsystem 604. This visual representation may take the form of a graphical user interface (GUI). Display subsystem 606 may include one or more display devices utilizing virtually any type of technology. In some implementations, display subsystem may include one or more virtual-, augmented-, or mixed reality displays.

When included, input subsystem 608 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 610 may be configured to communicatively couple computing system 600 with one or more other computing devices. Communication subsystem 610 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for electronic device identifier assignment at a host computing device comprises: receiving, from a separate electronic device, a current local identifier of the separate electronic device; receiving, from the separate electronic device, a full unique identifier of the separate electronic device; and assigning, to the separate electronic device, a host-specific local identifier by: based at least in part on determining that the current local identifier of the separate electronic device is included in a set of local identifier values available for assignment by the host computing device, assigning the host-specific identifier to the separate electronic device with a same local identifier value as the current local identifier; or based at least in part on determining that the current local identifier of the separate electronic device is already assigned by the host computing device to a different separate electronic device having a different full unique identifier, selecting the host-specific local identifier from the set of local identifier values available for assignment by the host computing device, and assigning the selected host-specific local identifier to the separate electronic device. In this example or any other example, selecting the selected host-specific local identifier includes randomly selecting a local identifier value of the set of local identifier values available for assignment. In this example or any other example, the method further comprises tracking a length of time since the separate electronic device was last detected by the host computing device, and based at least in part on the length of time exceeding a threshold time, returning the host-specific local identifier to the set of local identifier values available for assignment. In this example or any other example, the method further comprises based at least in part on determining that all possible local identifier values have been assigned to a plurality of different separate electronic devices, identifying a separate electronic device of the plurality of separate electronic devices that has been least-recently detected by the host computing device, and returning a host-specific local identifier corresponding to the least-recently detected separate electronic device to the set of local identifier values available for assignment. In this example or any other example, the host computing device includes a touch-sensitive display. In this example or any other example, the current local identifier of the separate electronic device and the full unique identifier of the separate electronic device are received electrostatically. In this example or any other example, each local identifier is a 3-bit value. In this example or any other example, the separate electronic device is an active stylus.

In an example, a method for device identifier assignment at an electronic device comprises: transmitting, to a separate host computing device, a current local identifier of the electronic device; transmitting, to the separate host computing device, a full unique identifier of the electronic device; receiving, from the separate host computing device, a host-specific local identifier selected from a set of local identifier values available for assignment by the separate host computing device; wherein: based at least in part on the current local identifier of the electronic device being in the set of local identifier values available for assignment by the separate host computing device, the host-specific local identifier has a same local identifier value as the current local identifier of the electronic device; or based at least in part on the current local identifier of the electronic device being absent from the set of local identifier values available for assignment by the separate host computing device, the host-specific local identifier has a different local identifier value that replaces the current local identifier of the electronic device. In this example or any other example, the method further comprises, after receiving the host-specific local identifier from the separate host computing device, replacing the host-specific local identifier with a second host-specific local identifier received from a second separate host computing device. In this example or any other example, the host-specific local identifier and the second host-specific local identifier have a same local identifier value. In this example or any other example, the current local identifier of the electronic device is assigned at manufacture of the electronic device. In this example or any other example, the current local identifier of the electronic device was assigned by a separate host computing device that the electronic device has previously been paired with. In this example or any other example, each local identifier is a 3-bit value. In this example or any other example, the electronic device is an active stylus. In this example or any other example, the current local identifier of the electronic device and the full unique identifier of the electronic device are transmitted to the separate host computing device electrostatically.

In an example, a host computing device comprises: a touch-sensitive display, a logic subsystem; and a storage subsystem holding instructions executable by the logic subsystem to: receive, from an active stylus, a current local identifier of the active stylus; receive, from the active stylus, a full unique identifier of the active stylus; and assign, to the active stylus, a host-specific local identifier by: based at least in part on determining that the current local identifier of the active stylus is included in a set of local identifier values available for assignment by the host computing device, assign the host-specific identifier to the active stylus with a same local identifier value as the current local identifier; or based at least in part on determining that the current local identifier of the active stylus is already assigned by the host computing device to a different separate electronic device having a different full unique identifier, select the host-specific local identifier from the set of local identifier values available for assignment by the host computing device, and assign the selected host-specific local identifier to the active stylus. In this example or any other example, the instructions are further executable to track a length of time since the active stylus was last detected by the host computing device, and based at least in part on the length of time exceeding a threshold time, return the host-specific local identifier to the set of local identifier values available for assignment. In this example or any other example, the instructions are further executable to, based at least in part on determining that all possible local identifier values have been assigned to a plurality of different separate electronic devices, identify a separate electronic device of the plurality of separate electronic devices that has been least-recently detected by the host computing device, and return a host-specific local identifier corresponding to the least-recently detected separate electronic device to the set of local identifier values available for assignment. In this example or any other example, each local identifier is a 3-bit value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for electronic device identifier assignment at a host computing device, the method comprising:
receiving, from a separate electronic device, a current local identifier of the separate electronic device;

receiving, from the separate electronic device, a full unique identifier of the separate electronic device, different from the current local identifier;

transmitting, to the separate electronic device, a host-specific local identifier to be used by the host computing device to identify the separate electronic device, the host-specific local identifier to be stored by the separate electronic device as a replacement for the current local identifier, and the host-specific local identifier assigned by:

based at least in part on determining that the current local identifier of the separate electronic device is already assigned to a different separate electronic device having a different full unique identifier, selecting the host-specific local identifier from a set of local identifier values available for assignment; and assigning the selected host-specific local identifier to the separate electronic device;

tracking a length of time since the separate electronic device was last detected by the host computing device; and based at least in part on the length of time exceeding a threshold time, returning the host-specific local identifier to the set of local identifier values available for assignment.

2. The method of claim 1, wherein selecting the selected host-specific local identifier includes randomly selecting a local identifier value of the set of local identifier values available for assignment.

3. The method of claim 1, wherein the host computing device includes a touch-sensitive display.

4. The method of claim 3, wherein the current local identifier of the separate electronic device and the full unique identifier of the separate electronic device are received electrostatically.

5. The method of claim 1, wherein the separate electronic device is an active stylus.

6. The method of claim 1, wherein the host-specific local identifier is assigned by determining whether the current local identifier of the separate electronic device is present in the set of local identifier values available for assignment, or absent from the set of local identifier values available for assignment.

7. A host computing device, comprising:
a touch-sensitive display;
a logic subsystem; and
a storage subsystem holding instructions executable by the logic subsystem to:
receive, from an active stylus, a current local identifier of the active stylus;
receive, from the active stylus, a full unique identifier of the active stylus, different from the current local identifier;
transmit, to the active stylus, a host-specific local identifier to be used by the host computing device to identify the active stylus, the host-specific local identifier to be stored by the active stylus as a replacement for the current local identifier, and the host-specific local identifier assigned by:
based at least in part on determining that the current local identifier of the active stylus is already assigned to a different separate electronic device having a different full unique identifier, select the host-specific local identifier from a set of local identifier values available for assignment; and
assign the selected host-specific local identifier to the active stylus;
track a length of time since the active stylus was last detected by the host computing device; and
based at least in part on the length of time exceeding a threshold time, return the host-specific local identifier to the set of local identifier values available for assignment.

8. The host computing device of claim 7, wherein the host-specific local identifier is assigned by determining whether the current local identifier of the separate electronic device is present in the set of local identifier values available for assignment, or absent from the set of local identifier values available for assignment.

9. A method for electronic device identifier assignment at a host computing device, the method comprising:
receiving, from a separate electronic device, a current local identifier of the separate electronic device;
receiving, from the separate electronic device, a full unique identifier of the separate electronic device, different from the current local identifier; and
transmitting, to the separate electronic device, a host-specific local identifier to be used by the host computing device to identify the separate electronic device, the host-specific local identifier to be stored by the separate electronic device as a replacement for the current local identifier, and the host-specific local identifier assigned by:
based at least in part on determining that the current local identifier of the separate electronic device is already assigned to a different separate electronic device having a different full unique identifier, selecting the host-specific local identifier from a set of local identifier values available for assignment;
assigning the selected host-specific local identifier to the separate electronic device; and
based at least in part on determining that all possible local identifier values have been assigned to a plurality of different separate electronic devices, identifying a separate electronic device of the plurality of separate electronic devices that has been least-recently detected by the host computing device, and returning a host-specific local identifier corresponding to the least-recently detected separate electronic device to the set of local identifier values available for assignment.

10. The method of claim 9, wherein the host computing device includes a touch-sensitive display.

11. The method of claim 10, wherein the current local identifier of the separate electronic device and the full unique identifier of the separate electronic device are received electrostatically.

12. The method of claim 9, wherein the separate electronic device is an active stylus.

13. The method of claim 9, wherein selecting the selected host-specific local identifier includes randomly selecting a local identifier value of the set of local identifier values available for assignment.

* * * * *